US008246225B2

(12) United States Patent
Chang

(10) Patent No.: US 8,246,225 B2

(45) Date of Patent: Aug. 21, 2012

(54) HEAD LIGHT OR FOG LIGHT FOR MOTORCYCLES AND AUTOMOBILES

(76) Inventor: Yung-Lung Chang, Tainan (TW)

(*) Notice: Subject to any disclaimer, the term of this patent is extended or adjusted under 35 U.S.C. 154(b) by 20 days.

(21) Appl. No.: 13/073,574

(22) Filed: Mar. 28, 2011

(65) Prior Publication Data

US 2012/0014123 A1 Jan. 19, 2012

(30) Foreign Application Priority Data

Jul. 13, 2010 (TW) .................................. 99122930

(51) Int. Cl.
*B62J 6/02* (2006.01)
*B60Q 1/20* (2006.01)

(52) U.S. Cl. ........................................ 362/475; 362/548

(58) Field of Classification Search .................. 362/475, 362/507, 538, 545, 547, 548
See application file for complete search history.

(56) References Cited

U.S. PATENT DOCUMENTS 5,158,350 A * 10/1992 Sato .............................. 362/538
7,311,430 B2 * 12/2007 Tsukamoto et al. .......... 362/545
2006/0120094 A1 * 6/2006 Tsukamoto et al. .......... 362/518

FOREIGN PATENT DOCUMENTS

TW 096138244 10/2007
TW 098215839 8/2009

* cited by examiner

*Primary Examiner* — David V Bruce
(74) *Attorney, Agent, or Firm* — J.C. Patents

(57) ABSTRACT

A head light or a fog light for automobiles and automobiles includes a housing provided therein with an optically reflecting surface and a heat-dissipating member that is formed with LED grooves for receiving LEDs therein. The LEDs are installed for an angle to enable the light of the LEDs to be directly irradiated on the optically reflecting surface in a certain angle and simultaneously, the light will be reflected by the optically reflecting surface and cast out through the transparent front lampshade. Thus, the light produced by the LEDs can be utilized to a maximum extent, able to enhance lighting effect of the LEDs.

8 Claims, 3 Drawing Sheets

HEAD LIGHT OR FOG LIGHT FOR MOTORCYCLES AND AUTOMOBILES

CROSS-REFERENCE TO RELATED APPLICATION

This application claims the priority benefit of Taiwan application No. 99122930 filed on Jul. 13, 2010, the content of which is herein incorporated by reference in its entirety.

BACKGROUND OF THE INVENTION

1. Field of the Invention

This invention relates to a head light or a fog light for motorcycles and automobiles, particularly to one installed therein with LEDs that can directly emit light to an optically reflecting surface through a certain angle provided between the LEDs and a heat-dissipating member. The light of the LEDs are reflected by the optically reflecting surface and simultaneously cast out through a transparent front lampshade. By so designing, light produced by the LEDs can be utilized to a maximum extent and lighting effect of the LEDs can be enhanced.

2. Description of the Prior Art

A conventional LED car lamp, as disclosed in a Taiwan patent NO. 096138244, titled "LED LAMP", includes a lamp housing provided therein with a first and a second reflecting member that are unsymmetrical and respectively disposed with a reflecting surface with specified curvature. A lighting unit is positioned in an accommodating space, consisting of a first and a second LED, which carry out lighting independently. Light of the first and light of the second LED are respectively emitted to the reflecting surface of the first and the second reflecting member, which reflect the light of the first and second LED, forming two lighting ranges with light beam of two different angles. However, the conventional LEDs are respectively installed at two sides of a heat-dissipating device and positioned in the same direction of the heat-dissipating device and thus, light produced by the LEDs cannot match with the reflecting angles of the first and the second reflecting surface and fails to reflect light with maximum efficiency. After all, the intensity of lighting produced by the LEDs will gradually become attenuated from a right center to both sides of the LEDs but, when light with the strongest lighting intensity produced by the LEDs is unable to fully contact with the first and the second reflecting surface, the amount of light reflected by the first and the second reflecting surface will be reduced, thus disabling the LEDs to produce a marked effect of lighting with high efficiency.

Another conventional LED car lamp disclosed in a Taiwan patent No. 098215839, titled "STRUCTURE OF A CAR LAMP", has the interior of a reflecting lamp base provided with a vertical and a horizontal optically curved surface and have a lampshade covered on the reflecting lamp base. A basic plate is received in a hollowed hole at the bottom of the reflecting lamp base and installed thereon with a single high-power LED and a heat-conducting silica gel pad having a heat-conducting block fixed at a lower side for transmitting and dissipating heat energy produced by the high-power LED. The drawback of this conventional device is that the light of the LED received by the optically curved surfaces in the reflecting lamp base is at two sides where intensity of lighting is the weakest and as a result, the light produced by the LED can only be used with minimum efficiency and the car lamps cannot give out high-power light.

SUMMARY OF THE INVENTION

The objective of this invention is to offer a method for elevating lighting efficiency of LEDs to let such LEDs universally used for a head light or for a fog light of motorcycles and automobiles to lower amount of power consumption (The amount of power consumption of an LED of this invention is about 9 watts, while a traditional LED is about 55 watts), saving power and conforming to environmental protection.

The head light or the fog light for motorcycles and automobiles in the present invention includes a housing having its interior provided with an optically reflecting surface that is combined together with the housing. The housing is made of aluminum alloy or magnesium alloy to enable the housing to carry out action of reflection and heat dissipation for lowering the temperature of a car light.

The head light or the fog light for motorcycles and automobiles in the present invention has the interior of the housing installed with a heat-dissipating member that is combined with the housing and can be freely adjusted in heat-dissipating area for matching with heat dissipation efficiency of a car light.

The head light or the fog light for motorcycles and automobiles in the present invention has the housing provided with LED grooves respectively for receiving the LEDs, which are installed for an angle $\oint$ to enable the strongest light produced by the LEDs to be irradiated on the optically reflecting surface with the best lighting intensity for enhancing lighting efficiency of the LEDs.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
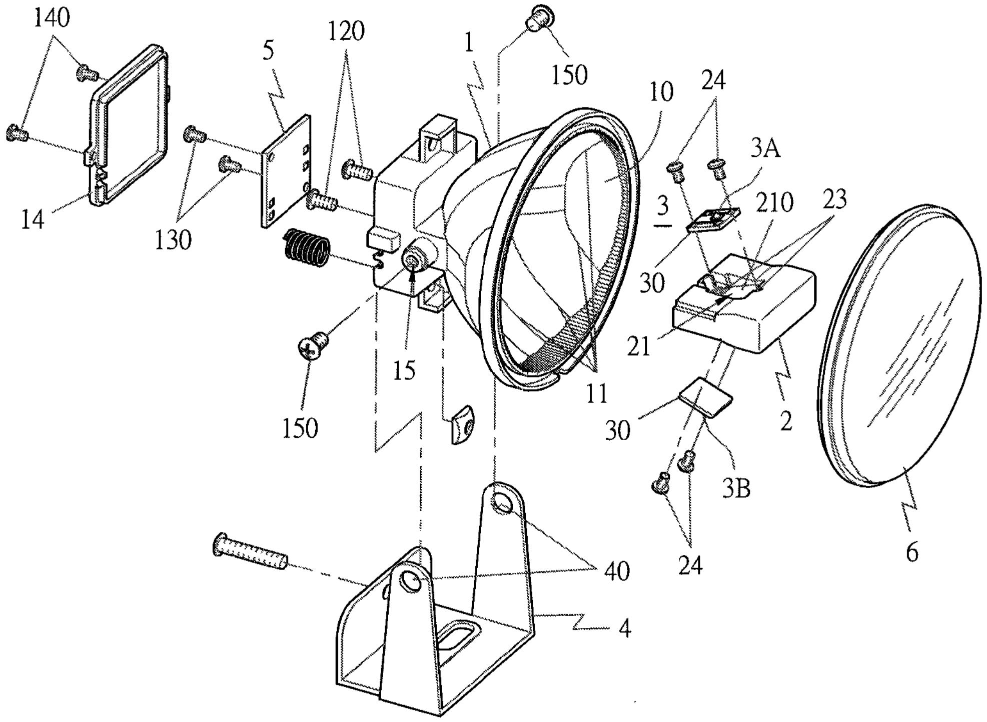
FIG. 1 is an exploded perspective view of a head light or a fog light for motorcycles and automobiles in the present invention.
Figure 2:
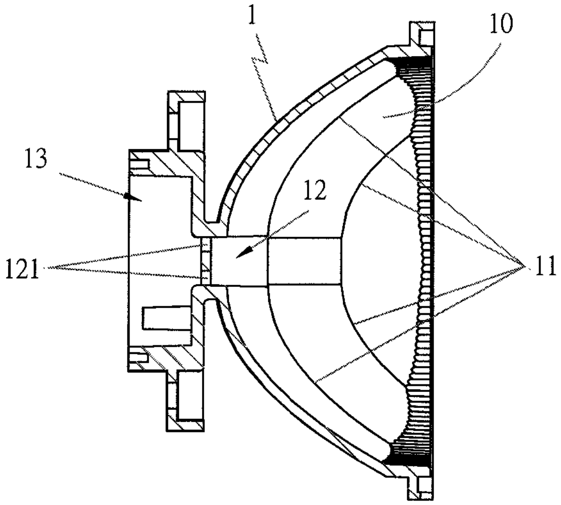
FIG. 2 is a cross-sectional view of a lamp housing in the present invention.
Figure 3:
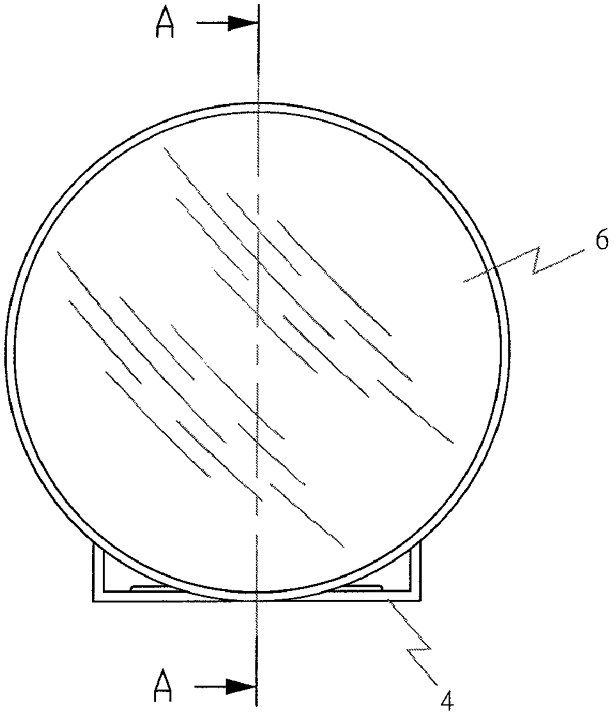
FIG. 3 is a front view of a head light or a fog light for motorcycles and automobiles in the present invention.

A preferred embodiment of a head light or a fog light for motorcycles and automobiles in the present invention, as shown in FIGS. 1, 2 and 3, includes a housing 1, a heat-dissipating member 2 and two sets of LEDs as main components combined together.

The housing is made of aluminum alloy or magnesium alloy and, if made of magnesium alloy, the housing will become light and possess higher efficiency in heat dissipating. Of course, other new materials better in quality and lower in cost can also be applicable to the housing of this invention. The housing 1 is provided inside with an optically reflecting surface 10 that is formed with different optically reflecting curved lines able to receive light produced by the LEDs with maximum efficiency. To enable the head light or the fog light of this invention to produce a best lighting angle and reduce light loss, the optically reflecting surface 10 has its upper and lower portion respectively disposed with several vertical streaks 11 to let the light rays of the car lamp cast horizontally and most of the light source of the car lamp horizontally distributed to the place a little above the road surface in front of the car, letting the car lamps tally with the norm of ECE (Economic Commission for Europe) or the norm of SAE (Society of Automotive Engineers) or the norm required in other countries. Thus, a driver can be aware of the information and condition of a road surface via the car lamps and, since light of the car lamps is distributed on the road surface, not casting to the driver's eyes of a car coming in the opposite direction and making the driver dizzy, able to enhance security in driving.

Figure 4:
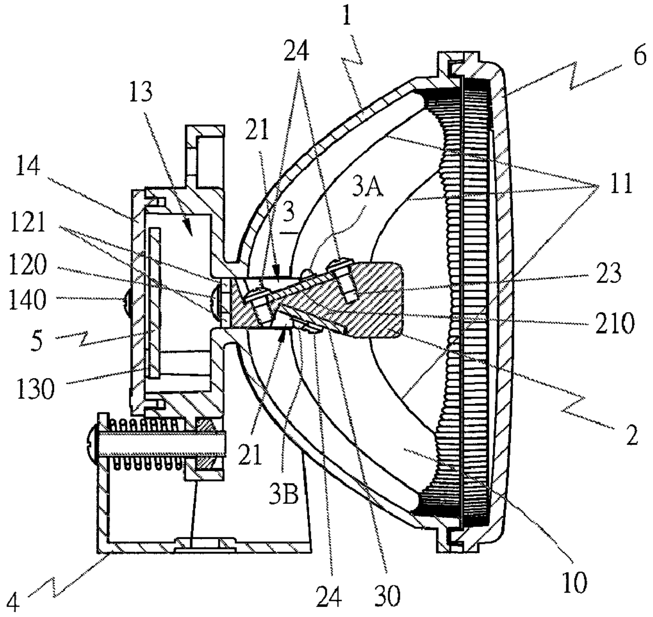
FIG. 4 is a cross-sectional view of the line A-A in FIG. 3.
Figure 5:
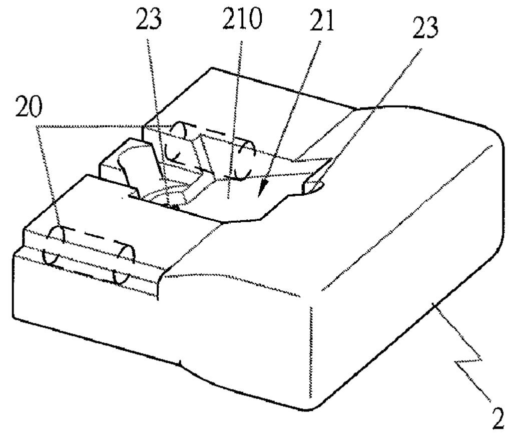
FIG. 5 is a schematic view of a heat-dissipating member in the present invention.
Figure 6:
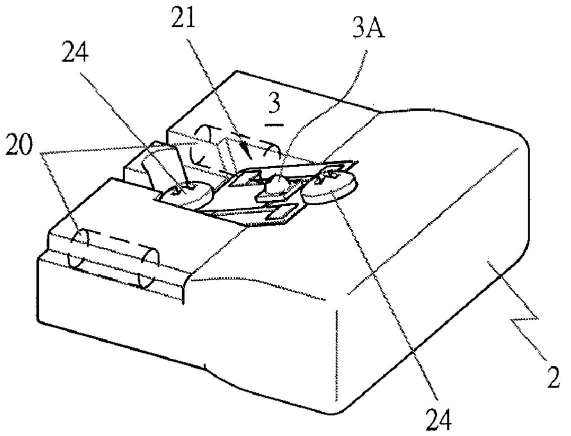
FIG. 6 is a schematic view illustrating that the heat-dissipating member and LEDs are combined together in the present invention.
Figure 7:
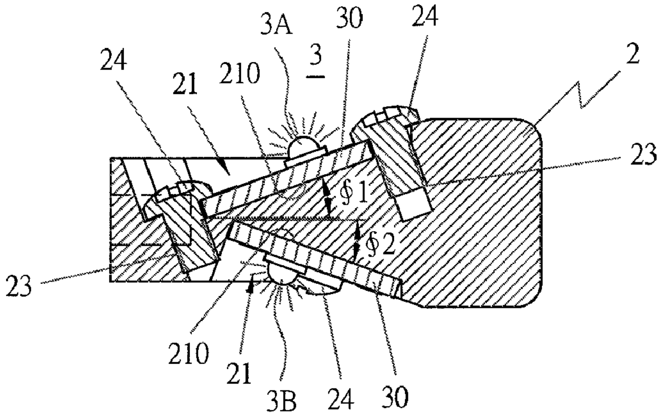
FIG. 7 is a cross-sectional view showing a combined condition of the heat-dissipating member and the LEDs in the present invention.

The housing 1 has an inner side formed with a combining groove 12 having its bottom wall bored with a hole (not shown) for a bolt 120 to be inserted therethrough to combine the housing 1 together with the heat-dissipating member 2, and the bottom wall of the combining groove 12 is also disposed with conducting wire holes 121 for the conducting wires of the LEDs 3 to be inserted therethrough and connected with the LEDs 3, as shown in FIGS. 2 and 4.

The housing 1 further has its rear side provided with a base plate groove 13 for receiving a control circuit base plate 5, which is locked with the housing 1 by bolts 130. A cover plate 14 is covered on the control circuit base plate 5 and combined with the base plate groove 13 of the housing 1 by means of bolts 140 to secure the control circuit basic plate 5 in the base plate groove 13, as shown in FIGS. 2 and 4.

Furthermore, the housing 1 has its rear side bored with bolt holes 15, and a fixing seat 4 to be combined with the housing 1 and to be fixed in a car lamp groove is bored with insert holes 40, with bolts 150 respectively inserted through the insert holes 40 of the fixed seat 4 and screwed with the bolt holes 15 of the housing 1 to combine the housing 1 and the fixing seat 4 together.

A transparent front lampshade 6 is positioned at the front side of the housing 1 for protecting the LEDs and enabling the light of the car lamp to pass therethrough and to be cast on the road surface.

Referring to FIGS. 1 and 5 to 7, the heat-dissipating member 2 is combined with the combining groove 12 of the housing 1 and, before being combined, the combining groove 12 has the inner side of its bottom wall smeared with heat-dissipating material like heat-dissipating grease for quickly transmitting high temperature produced by the heat-dissipating member 2 to the housing 1 to elevate effect of heat dissipation. The heat-dissipating member 2 is bored with bolt holes 20 for the bolts 120 to be screwed therein to combine the heat-dissipating member 2 together with the combining groove 12 of the housing 1, as shown in FIG. 4, and further formed with LED grooves 2 respectively disposed with an inclined wall 210, and the heat-dissipating member 2 is bored with positioning holes 23 for bolts 24 to be respectively screwed therein and to clamp the LEDs in the LED grooves 21.

Two sets of LEDs are respectively fixed on a base plate 30 and positioned in the LED grooves 21 at two sides of the heat-dissipating member 2, forming a combination angle § with the LED groove 21. If the LEDs are composed of a first LED 3A and a second LED 3B, the first and the second LED 3A and 3B are respectively received in the LED grooves 21 at two sides of the heat-dissipating member 2, with an angle §1 and angle §2 respectively formed between the first LED 3A and the LED groove 21 and between the second LED 3B and the LED grooves 21. Whether the angle §1 should be larger than, or equal to or smaller than the angle §2 depends on how the optically reflecting surface 10 is installed, but the angle §1 and the angle §2 must be less than 90 degrees so as to match with the installed condition of the optically reflecting surface 10. Thus, the light produced by the LEDs 3, which is right in the center and strongest in lighting intensity, can be directly irradiated on the optically reflecting surface 10 so that the light of the LEDs 3 may attain a maximum rate of utilization for elevating lighting effect of the LEDs, able to lower power consumption and get rid of the shortcoming of the conventional LED that consumes too much power.

To sum up, the installed direction of the LED of this invention completely departs from a traditional mode for the purpose of enabling the light of the LEDs to form a best matching angle with the optically reflecting surface of the housing. Then, the light produced by the LEDs is reflected out with maximum efficiency by the optically reflecting surface of the housing, able to enhance lighting efficiency of an LED-made head light or fog light of motorcycles and automobiles or LED lamps with other uses and lower power consumption for meeting requirement of environmental protection.

While the preferred embodiment of the invention has been described above, it will be recognizes and understood that various modifications may be made therein and the appended claims are intended to cover all such modifications that may fall within the spirit and scope of the invention.

What is claimed is:

1. A head light or a fog light for motorcycles and automobiles comprising a housing, said housing provided therein with an optically reflecting surface and a heat-dissipating member, said heat-dissipating member bored with LED grooves, said LED grooves respectively formed with an inclined wall for installing LEDs thereon, an angle §formed between said LEDs and said LED groove, light produced by said LEDs able to be reflected and cast out by said optically reflecting surface at a maximum rate of utilization, said head light able to heighten lighting efficiency of said LED.

2. A head light or a fog light for motorcycles and automobiles as claimed in claim 1, wherein said housing is provided inside with said optically reflecting surface that is disposed with different optically reflecting curved lines and vertical streaks.

3. A head light or a fog light for automobiles and automobiles as claimed in claim 1, wherein said housing has an interior provided with a combining groove having a bottom wall bored with a hole for a bolt to be inserted therethrough to combine said housing together with said heat-dissipating member, said combining groove disposed with conducting wire holes for conducting wires to be inserted therethrough.

4. A head light or a fog light for automobiles and automobiles as claimed in claim 1, wherein said housing has a rear side fixed with a base plate groove for receiving a control circuit base plate of said LED, said control circuit base plate firmly fixed with said housing by means of bolts and covered by a cover plate.

5. A head light or a fog light for automobiles and automobiles as claimed in claim 1, wherein said heat-dissipating member is combined with said combing groove of said housing and, before being combined, said combining groove has inner side of bottom wall smeared with heat-dissipating material.

6. A head light or a fog light for automobiles and automobiles as claimed in claim 1, wherein said heat-dissipating member is bored with positioning holes for bolts to be respectively screwed therein and firmly clamp said LEDs in said LED grooves.

7. A head light or a fog light for automobiles and automobiles as claimed in claim 1, wherein said LEDs are composed of a first LED and a second LED respectively received in said LED grooves at two sides of said heat-dissipating member, and an angle §1 and angle §2 are respectively formed between said first LED and said heat-dissipating member and between said second LED and said heat-dissipating member, and said angle §1 can be larger than, or equal to or smaller than said angle §2.

8. A head light or a fog light for automobiles and automobiles as claimed in claim 7, wherein said angle §1 and said angle §2 are smaller than 90 degrees for matching with installed condition of said optically reflecting surface.

* * * * *